(12) United States Patent  
Dziengowski et al.

(10) Patent No.: US 8,322,000 B2
(45) Date of Patent: Dec. 4, 2012

(54) FREE FALLING LOCKING TONGUE

(75) Inventors: Michael Dziengowski, Royal Oak, MI (US); Jeff Russell, Warren, MI (US); Timothy Cahill, Dryden, MI (US)

(73) Assignee: Autoliv ASP, Inc., Ogden, UT (US)

( * ) Notice: Subject to any disclaimer, the term of this patent is extended or adjusted under 35 U.S.C. 154(b) by 460 days.

(21) Appl. No.: 12/623,532

(22) Filed: Nov. 23, 2009

(65) Prior Publication Data
US 2011/0119874 A1  May 26, 2011

(51) Int. Cl.
*A44B 11/00* (2006.01)
(52) U.S. Cl. ............................................. 24/196; 24/171
(58) Field of Classification Search .................. None
See application file for complete search history.

(56) References Cited

U.S. PATENT DOCUMENTS

| | | | |
|---|---|---|---|
| 3,534,448 A | 10/1970 | Hughes | |
| 3,888,541 A | 6/1975 | Stephenson | |
| 4,386,452 A | 6/1983 | Stephenson | |
| 4,551,889 A | 11/1985 | Narayan et al. | |
| 4,893,874 A | 1/1990 | Childress et al. | |
| 5,023,980 A | 6/1991 | Thomas | |
| 5,050,274 A | 9/1991 | Staniszewski et al. | |
| 5,058,244 A | 10/1991 | Fernandez | |
| 5,138,749 A * | 8/1992 | McCune et al. | ............... 24/196 |

OTHER PUBLICATIONS

PCT/US2010/056994—International Search Report—Jan. 18, 2011.

* cited by examiner

*Primary Examiner* — Jack W. Lavinder
(74) *Attorney, Agent, or Firm* — Sally J. Brown; Brink Hofer Gilson & Lione

(57) ABSTRACT

A locking tongue seat belt assembly includes a tongue plate with a pair of side portions, an end flange that extends along the rear of the tongue plate, a pair of spaced apart side flanges that extend from the tongue plate along respective side portions of the tongue plate, and a lock bar that extends between the two side flanges. The ends of the lock bar are guided in respective slots of the side flanges such that the lock bar is movable between a locked position and an unlocked position. The lock bar and the end flange are configured to receive seat belt webbing between the lock bar and the end flange. The seat belt webbing is cinched between the lock bar and the end flange when the lock bar is in the locked position.

9 Claims, 3 Drawing Sheets

FREE FALLING LOCKING TONGUE

BACKGROUND

The present invention relates generally to a free falling locking tongue for a seat belt.

In many types of tongues for seat belt systems, belt slippage from the shoulder portion to the lap portion occurs during occupant excursion, which leads to an increase in the force on the shoulder portion of the belt and therefore an increase in occupant chest deflection. Locking tongues have been employed in certain seat belt systems. These tongues prevent the translation of the webbing from the shoulder portion to the lap portion and therefore reduces loading on the occupant's chest. In particular, the locking tongues are able to slide on the seat belt webbing to provide a proper fit over the occupant but are also able to lock or cinch the webbing during sudden deceleration of the vehicle to prevent loosening of the seat belt to properly protect the occupant.

Such locking tongues, however, have been used mostly in two point applications, since when used in three point applications, these locking tongues often result in a long piece of hanging webbing getting caught in the vehicle's door when it is closed because of poor free sliding performance of the tongue. Further, in these tongues, the seat belt webbing typically passes through an aperture in the tongue body and then wraps around a lock bar, which generates uneven load distribution across the webbing when the webbing is cinched or pinched between the lock bar and the edge of the aperture.

BRIEF SUMMARY

To overcome the enumerated drawbacks and other limitations of the related art, the present invention provides a free falling locking tongue for seat belt systems. The locking tongue includes a tongue plate with a pair of side portions, an end flange that extends along the rear of the tongue plate, a pair of spaced apart side flanges that extend from the tongue plate along respective side portions of the tongue plate, and a lock bar that extends between the two side flanges. The ends of the lock bar are guided in respective slots of the side flanges such that the lock bar is movable between a locked position and an unlocked position. The lock bar and the end flange are configured to receive seat belt webbing between the lock bar and the end flange. The seat belt webbing is cinched between the lock bar and the end flange when the lock bar is in the locked position.

In some arrangements, the locking tongue includes a sleeve that encapsulates the lock bar. The sleeve may have an outer contour that matches the profile of the contour of the end flange.

Some embodiments of the invention may have one or more of the following advantages. Since the seat belt webbing simply passes through the locking tongue body between the lock bar and the end flange rather than through an aperture in the body of the tongue plate, the configuration of the locking tongue may minimize the complexity of the seat belt webbing through the locking tongue assembly. As such, the potential for tearing the webbing is reduced when a load is applied to the webbing. By matching the contour of the sleeve with the contour of the end flange, the tension in the webbing is distributed across the width of the webbing.

Further features and advantages will become apparent from the following description and from the claims.

BRIEF DESCRIPTION OF THE DRAWINGS

In the accompanying drawings the components are not necessarily to scale, emphasis instead being placed upon illustrating the principles of the invention. Moreover, like reference numerals designate corresponding parts throughout the views. In the drawings.

DETAILED DESCRIPTION OF THE INVENTION

Figure 1:
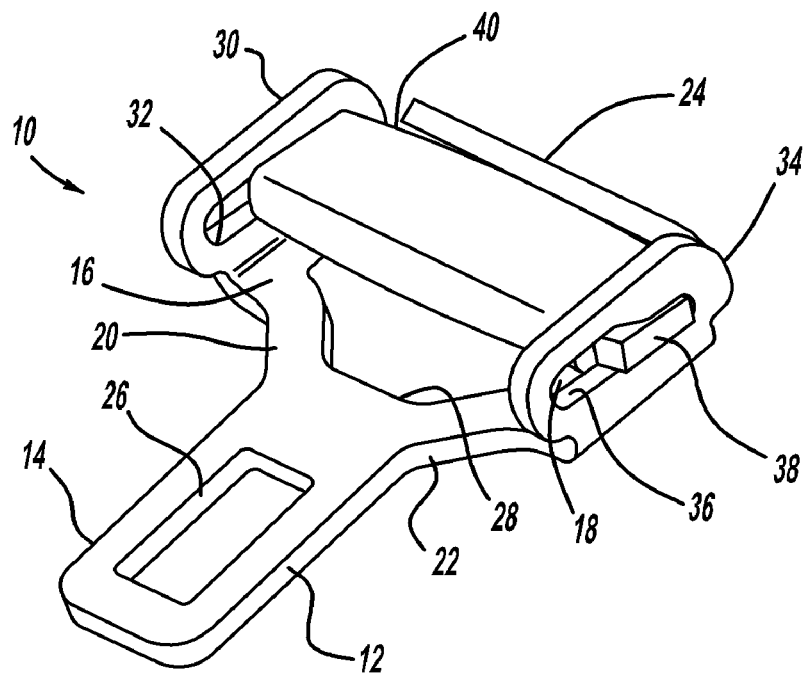
FIG. 1 is a perspective view of a free falling locking tongue in accordance with the invention.
Figure 2:
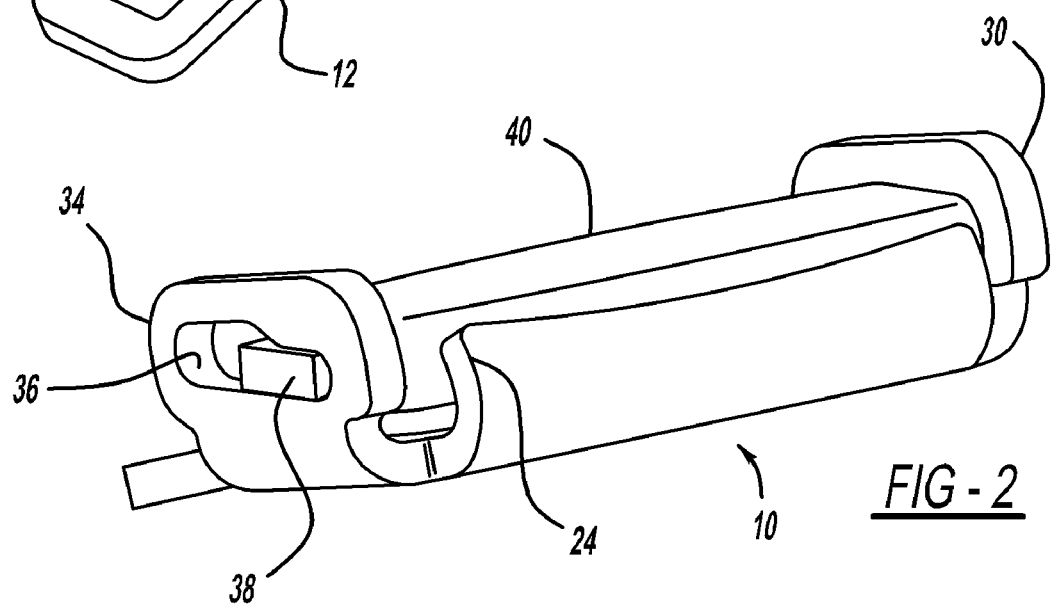
FIG. 2 is a rear view of the free falling locking tongue of FIG. 1.
Figure 3:
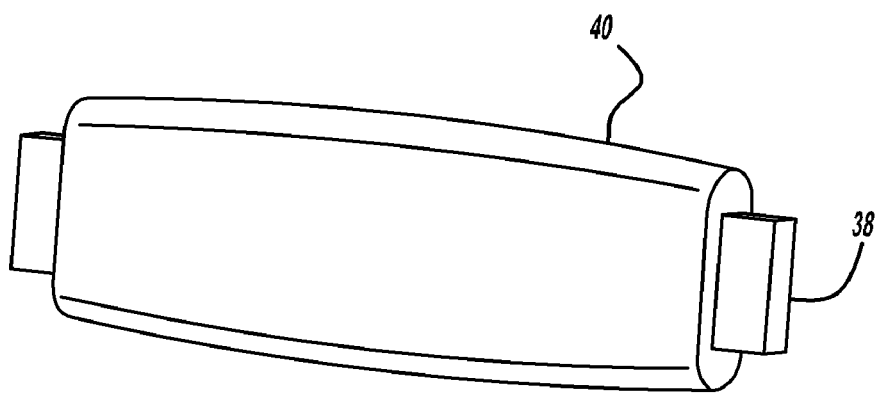
FIG. 3 shows a lock bar with a sleeve of the free falling locking tongue of FIG. 1.

Referring now to FIGS. 1 through 5, a free falling locking tongue for a seat belt assembly embodying the principles of the present invention is illustrated therein and designated at 10. The locking tongue 10 includes a tongue plate 12 with a tongue portion 14 and a pair of side portions 16 and 18 connected to the tongue portion 14 with a pair of connectors 20 and 22, respectively. A generally curved end flange 24 is connected to the side portions 16 and 18 and extends along the rear of the tongue plate 12. The outer edge of the end flange 24 typically has a contour as shown clearly in FIG. 2.

The tongue portion 14 is provided with a latch aperture 26, and the rear of the tongue portion 14, the connectors 20 and 22, the side portions 16 and 18, and the end flange 24 surround a second aperture 28. The primary purpose of the second aperture 28 is for weight reduction of the locking tongue 10. A flange 30 with a slot 32 extends generally along the length of the side portion 16, and a flange 34 with a slot 36 is located on the other side of the tongue plate 12 and extends generally along the length of the side portion 18. The flanges 30 and 34 extend away from the side portions 16 and 18 so that they are generally positioned at right angles relative to the plane of the side portions 16 and 18.

The locking tongue 10 further includes an elongated lock bar 38. One end of the lock bar 38 resides in the slot 32, and the other end resides in the slot 36. A sleeve 40 encompasses most of the lock bar 38 and is typically a molded component that encapsulates the lock bar 38. The contour of the sleeve 40 generally matches the contour of edge the end flange 24 so that tension in a seat belt webbing is distributed across the width of the webbing when it is cinched between the sleeve 40 and the end flange 24 as described below in more detail.

Figure 4:
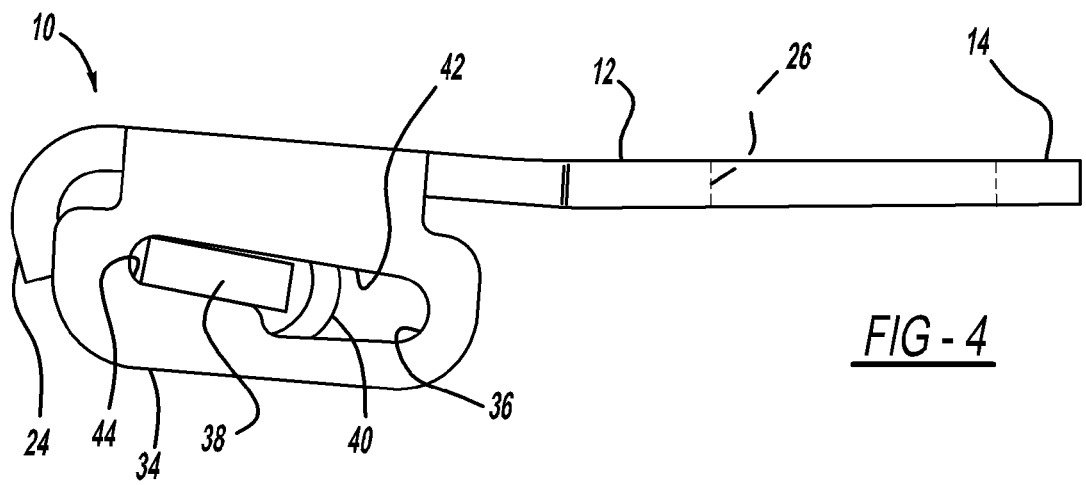
FIG. 4 is a side view of the free falling locking tongue of FIG. 1 with the lock bar in a locked position in accordance with the invention.
Figure 5:
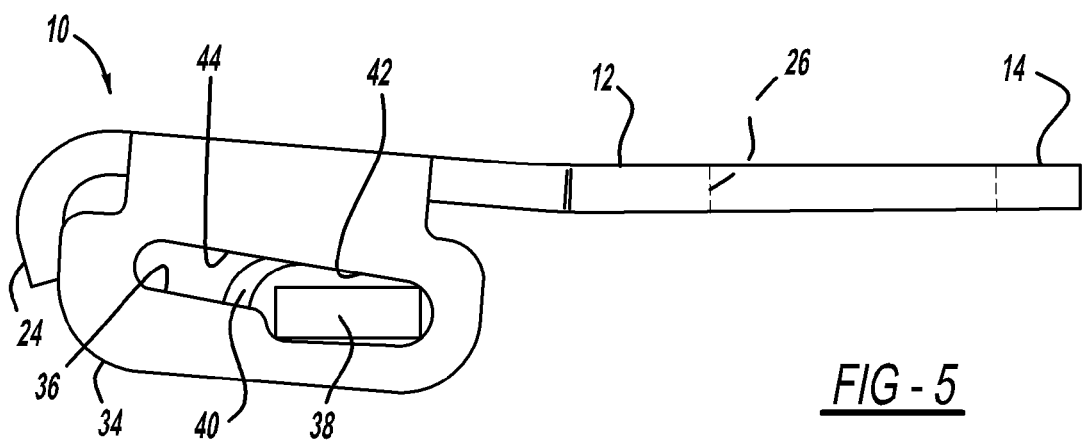
FIG. 5 is a side view of the free falling locking tongue of FIG. 1 with the lock bar in an unlocked position in accordance with the invention.

As shown more clearly in FIGS. 4 and 5, the slot 36 includes an enlarged section 42 and a narrow section 44. The slot 32 on the other side of the tongue plate 12 has similar enlarged and narrow sections 46 and 48 (FIGS. 6 and 7), respectively, such that the ends of the lock bar 38 are able to slide along the slots 32 and 36 between the enlarged and narrow sections of each slot 32 and 36 depending on the load applied to the seat belt webbing.

Referring in particular to FIG. 4, the lock bar 38 is shown situated in the narrow portion 44 in a locked position, whereas in FIG. 5, the lock bar 38 is shown situated in the enlarged section 42 in an unlocked position. Note that as the ends of the lock bar 38 slide along the slots 32 and 36 from the locked position (FIG. 4) to the unlocked position (FIG. 5), the lock bar 38 slightly rotates (counterclockwise in these views) about its longitudinal axis, and, of course, the lock bar 38 rotates in the opposite direction when it moves from the unlocked position to the locked position.

Figure 6:
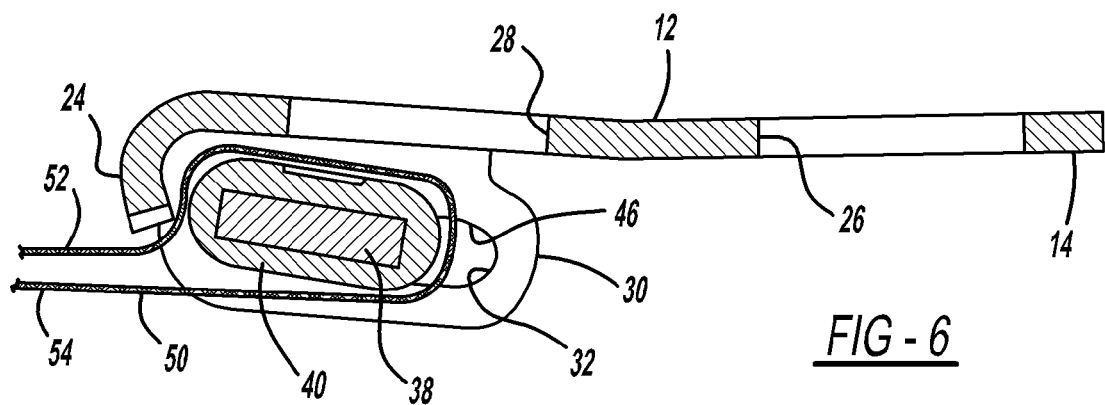
FIG. 6 is a cross sectional view of the free falling locking tongue of FIG. 1 shown with a seat belt webbing and the lock bar in the locked position in accordance with the invention.
Figure 7:
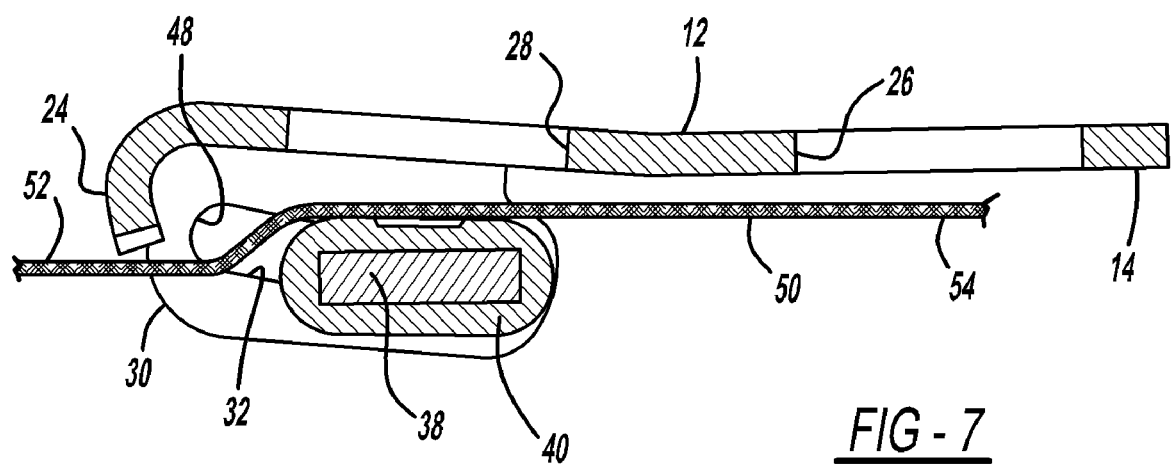
FIG. 7 is a cross sectional view of the free falling locking tongue of FIG. 1 shown with the seat belt webbing and the lock bar in the unlocked position in accordance with the invention.

The locking tongue 10 is suitable for use in both two point and three point seat belt systems. FIGS. 6 and 7 show the locking tongue 10 in use with a seat belt webbing 50 with a leading section 54 and a trailing section 52 situated between the sleeve 40 and the end flange 24. When the locking tongue 10 is in use, the occupant typically grabs the locking tongue 10 and inserts the tongue portion 14 into a buckle to secure the locking tongue 10 and the buckle together. While this occurs, the leading section 54 loops underneath the sleeve 40 and hence the lock bar 38 as shown in FIG. 6.

After the locking tongue 10 and the buckle are secured together, a sudden deceleration of the vehicle will result in the lock bar 38 to move to the locked position. In such a situation, the ends of the lock bar 38 slide along the slots 32 and 36 from the enlarged sections 46 and 42 to the narrow sections 48 and 44. During the sliding movement of the lock bar 38 into the locked position, the lock bar 38 slightly rotates as illustrated by the position of the lock bar 38 in FIGS. 6 and 7.

When the lock bar 38 is in the locked position (FIG. 6), the seat belt webbing 50 is cinched between the sleeve 40 and the outer edge of the curved end flange 24. As stated previously, the region of the sleeve 40 that cinches the webbing 50 against the edge of the end flange 24 has a contour that generally matches the profile of the contour of the edge of the end flange 24 to distribute the tension in the seat belt webbing 50 across the width of the webbing to reduce the potential for web tearing.

After use of the locking tongue 10 is no longer required, for example, when the occupant is ready to disembark from the vehicle, the occupant releases the tongue portion 14 from the buckle. In particular arrangements, a retractor retrieves the trailing section 52 of the seat belt webbing 50. As this occurs, the leading section 54 of the webbing 50 unwraps from underneath the sleeve 40 and hence the lock bar 38 (FIG. 7) so that the seat belt webbing 50 is oriented generally vertically, for example, in a three point seat belt system. Further, the lock bar 38 moves into the unlocked position, that is, the ends of the lock bar 38 move from the narrow sections 44 and 48 of the respective slots 36 and 32 to the enlarged sections 42 and 46 so that the seat belt webbing 50 is no longer cinched between the sleeve 40 and the end flange 24. The locking tongue 10 is then able to slide freely along the seat belt webbing 50 toward the leading section 54 when the seat belt webbing 50 has a general vertical orientation. In some implementations, a spring element is used to bias the lock bar 38 in the unlocked position.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

What is claimed is:

1. A locking tongue for a seat belt assembly comprising:
   a tongue plate with a pair of side portions;
   an end flange extending along the rear of the tongue plate;
   a pair of spaced apart side flanges, each side flange extending from the tongue plate along a respective side portion of the tongue plate and each side flange having a slot; and
   a lock bar that extends between the two side flanges, the lock bar having its ends guided in respective slots of the side flanges, the lock bar being movable between a locked position and an unlocked position, the lock bar and the end flange being configured to receive seat belt webbing between the lock bar and the end flange, the seat belt webbing being pinched between the lock bar and the end flange when the lock bar is in the locked position,
   wherein each slot has a narrow portion and an enlarged portion, the ends of the lock bar residing in the narrow portions of the slots when the lock bar is in the locked position and residing in the enlarged portions when the lock bar is in the unlocked position.

2. The locking tongue of claim 1 further comprising a sleeve mounted about the lock bar.

3. The locking tongue of claim 2 wherein the sleeve is a molded component that encapsulates the lock bar.

4. The locking tongue of claim 2 wherein the sleeve has a contour.

5. The locking tongue of claim 4 wherein the end flange curves away from the plane of the tongue plate and has an edge with a contour that generally matches the contour profile of the sleeve.

6. The locking tongue of claim 1 wherein the lock bar is in the locked position when a load is applied to the seat belt webbing.

7. The locking tongue of claim 1 wherein when the lock bar is in the unlocked position, the locking tongue is able to slide along the seat belt webbing.

8. The locking tongue of claim 7 wherein when the seat belt webbing is oriented generally vertically the locking tongue is configured to free fall to a rest position.

9. The locking tongue of claim 7 further comprising a spring element that biases the lock bar in the unlocked position.

* * * * *